US011734435B2

(12) United States Patent
Zhang et al.

(10) Patent No.: US 11,734,435 B2
(45) Date of Patent: Aug. 22, 2023

(54) IMAGE ENCRYPTION AND DECRYPTION COMMUNICATION ALGORITHM BASED ON TWO-DIMENSIONAL LAG COMPLEX LOGISTIC MAP

(71) Applicant: Qilu University of Technology, Shandong (CN)

(72) Inventors: Fangfang Zhang, Shandong (CN); Fengying Ma, Shandong (CN); Maoyong Cao, Shandong (CN); Xue Zhang, Shandong (CN); Zhengfeng Li, Shandong (CN)

(73) Assignee: Qilu University of Technology, Jinan (CN)

( * ) Notice: Subject to any disclaimer, the term of this patent is extended or adjusted under 35 U.S.C. 154(b) by 322 days.

(21) Appl. No.: 17/319,200

(22) Filed: May 13, 2021

(65) Prior Publication Data

US 2022/0121758 A1    Apr. 21, 2022

Related U.S. Application Data

(63) Continuation-in-part of application No. PCT/CN2021/072372, filed on Jan. 18, 2021.

(30) Foreign Application Priority Data

Oct. 16, 2020   (CN) .......................... 202011107589.7

(51) Int. Cl.
*G06F 21/60*       (2013.01)
*H04L 9/00*        (2022.01)

(52) U.S. Cl.
CPC ............ *G06F 21/602* (2013.01); *H04L 9/001* (2013.01)

(58) Field of Classification Search
CPC ..... G06F 21/602; G06F 21/6209; H04L 9/001
See application file for complete search history.

(56) References Cited

U.S. PATENT DOCUMENTS

2011/0311054 A1    12/2011   Wang

FOREIGN PATENT DOCUMENTS

| CN | 104050623 | A |   | 9/2014  |             |
|----|-----------|---|---|---------|-------------|
| CN | 107657579 | A |   | 2/2018  |             |
| CN | 108199828 | A | * | 6/2018  | ............. H04L 9/001 |
| CN | 108199828 | A |   | 6/2018  |             |
| CN | 109376540 | A |   | 2/2019  |             |
| CN | 109379510 | A |   | 2/2019  |             |
| CN | 110598430 | A | * | 12/2019 |             |
| CN | 111080506 | A |   | 4/2020  |             |

* cited by examiner

*Primary Examiner* — Philip J Chea
*Assistant Examiner* — Sangseok Park
(74) *Attorney, Agent, or Firm* — Loginov & Associates, PLLC; William A. Loginov

(57) ABSTRACT

In the field of image encryption and decryption, in order to solve the problem of small key space in the encryption process caused by low dimension of one-dimensional chaotic map and few initial values and control parameters, the present disclosure provides an image encryption and decryption communication algorithm based on two-dimensional lag complex Logistic map, which expands the variables of one-dimensional Logistic map from the real number domain to the complex number domain, improves the dimension of the mapping system, increases the number of keys, and expands the mapping range, wherein the new mapping system is more sensitive to small disturbances of initial values and parameters, which can break the strong correlation between pixels in the original image, so that the pixels of the encrypted image are uniformly distributed in the whole plane, and the features of the original image are hidden.

20 Claims, No Drawings

IMAGE ENCRYPTION AND DECRYPTION COMMUNICATION ALGORITHM BASED ON TWO-DIMENSIONAL LAG COMPLEX LOGISTIC MAP

RELATED APPLICATION

This application is a Section 371 bypass continuation-in-part of co-pending PCT Application No. PCT/CN2021/072372, filed Jan. 18, 2021, which claims the priority of the Chinese patent application filed in China National Intellectual Property Administration on Oct. 16, 2020, with the application number of 202011107589.7 and the present disclosure name of "Image Encryption and Decryption Communication Algorithm Based on Two-dimensional Lag Complex Logistic Mapping", the entire content of which is incorporated in the present disclosure by reference.

TECHNICAL FIELD

The present disclosure relates to an image encryption algorithm in the communication field, in particular to an image encryption and decryption communication algorithm based on two-dimensional lag complex Logistic map.

BACKGROUND

Compared with traditional text information, a digital image has large amount of data, high redundancy and strong correlation between pixels. Therefore, a traditional encryption algorithm such as DES algorithm and AES algorithm cannot meet the requirements of image encryption. Chaotic encryption is an encryption technology based on chaos theory, which has the characteristics of high sensitivity to initial values and control variables, inherent randomness and unpredictable trajectory. This chaotic characteristic is highly related to cryptography, so that chaotic image encryption has become a mainstream image encryption method.

In "Research on New One-dimensional Chaotic System and Encryption Characteristics", Li Xiajuan et al. put forward a new one-dimensional chaotic system to encrypt images. This one-dimensional system consists of three one-dimensional maps: Logistic map, Tent map and Sine map. The system encrypts images by pseudo-random sequences generated by chaotic maps. In "Efficient Image Encryption Algorithm Based on One-dimensional Chaotic Mapping", Ban duohan et al. combined Sine map with PWLCM map, and proposed an efficient one-dimensional complex map SPM to scramble and diffuse the pixels in images. In "Image Encryption Based on One-dimensional Chaotic Mapping and Bit Block Scrambling", Zhang Xuefeng et al. suggested using a Logistic map and bit block scrambling method to encrypt images. All the chaotic encryption technologies proposed by the above scholars are based on one-dimensional chaotic map. The one-dimensional map is simple in structure and easy to implement, but its key space is small, so it is difficult to resist exhaustive attacks, that is, when the encrypted image is transmitted in the channel, it is very likely to be intercepted and deciphered, resulting in information leakage.

SUMMARY

Based on this, the purpose of the present disclosure is to provide an image encryption and decryption communication algorithm based on two-dimensional lag complex Logistic map, so as to solve the problem of small key space in the encryption process caused by low dimension of one-dimensional chaotic map and few initial values and control parameters.

To achieve the above purpose, the present disclosure provides an image encryption communication algorithm based on two-dimensional lag complex Logistic map, comprising the steps of:

(a) reading a M×N dimensional grayscale image X to be encrypted, expressing the value of each pixel point in X by eight binary numbers, that is, dividing the value into eight bit planes; and taking the upper four-bit plane as H, and the lower four-bit plane as L, wherein each bit plane is a binary matrix of M×N;

(b) taking the value range of parameter b of the two-dimensional lag complex Logistic mapping system as [1.69, 2), taking parameter a as a real number that can be positive or negative, taking the values of a and b in the range, giving any initial value to the system, and iterating the system $N=N_0+2\times M\times N$ times, where $N_0 \in N^*$, and abandoning the previous $N_0$ iteration tracks to avoid instantaneous effect, so as to obtain four chaotic sequences x, $x_1$, $x_2$, $x_3$ with length $2\times M\times N$, where $$x = \frac{x_1 + x_2 + x_3}{3};$$

sorting the previous M×N numbers of the four chaotic sequences in an ascending order to obtain the position sequences $T_1$, $T_2$, $T_3$, $T_4$; then sorting the later M×N numbers of the four chaotic sequences in an ascending order to obtain the position sequences $T_{-1}$, $T_{-2}$, $T_{-3}$, $T_{-4}$;

(c) scrambling the lower four-bit plane L by using the position sequences $T_1$, $T_2$, $T_3$, $T_4$ to obtain a new lower four-bit plane Lp; scrambling the upper four-bit plane H by using the position sequences $T_{-1}$, $T_{-2}$, $T_{-3}$, $T_{-4}$ to obtain a new upper four-bit plane HH;

(d) performing modulo operation on the chaotic sequence $x_1$ according to the formula $f_1 = \lfloor |x_1|*10^{15} \mod 256 \rfloor$ to obtain a matrix $f_1$ containing M×N decimal numbers; dividing $f_1$ into eight bit planes by converting decimal numbers to binary numbers, taking the lower four-bit plane as $f_{-1}$, and then sorting the sequence in $f_{-1}$ in an ascending order to obtain the position sequence $T_{f1}$;

(e) superposing and performing modulo operation on a plurality of bit planes according to the formula clow=$(f_{-1}+Lp+HH)\mod 2$ to obtain a new binary matrix clow; scrambling clow using $T_{f1}$ to obtain Clow;

(f) keeping the parameters of the system unchanged, re-taking the initial value, iterating the system $N=N_0+2\times M\times N$ times, and abandoning the previous $N_0$ iteration tracks to avoid instantaneous effect, so as to obtain four chaotic sequences which is denoted as x', $x'_1$, $x'_2$, $x'_3$ with length $2\times M\times N$, where $$x' = \frac{x'_1 + x'_2 + x'_3}{3};$$

sorting the previous M×N numbers of the chaotic sequences in an ascending order to obtain the position sequence $T'_1$, $T'_2$, $T'_3$, $T'_4$; then sorting the later M×N numbers of the chaotic sequences in an ascending order to obtain the position sequences $T'_{-1}$, $T'_{-2}$, $T'_{-3}$, $T'_{-4}$;

(g) scrambling the upper four-bit plane H by using the position sequences $T'_1$, $T'_2$, $T'_3$, $T'_4$ to obtain a new upper four-bit plane Hp; scrambling Clow by using the position sequences T'$_{-1}$, T'$_{-2}$, T'$_{-3}$, T'$_{-4}$ to obtain the final encrypted lower four-bit plane Clow';

(h) performing modulo operation on the chaotic sequence x$_2$ according to the formula f$_2$=⌊|x$_2$|*10$^{15}$ mod256⌋ to obtain a matrix f$_2$ containing M×N decimal numbers; dividing f$_2$ into eight bit planes by converting decimal numbers to binary numbers, taking the lower four-bit plane as f$_{-2}$, and then sorting the sequence in f$_{-2}$ in an ascending order to obtain the position sequence T$_{f2}$;

(i) superposing and performing modulo operation on a plurality of bit planes according to the formula chigh=(f$_{-2}$+Hp+Clow')mod 2 to obtain a new binary matrix chigh; scrambling chigh using T$_{f2}$ to obtain the final encrypted upper four-bit plane Chigh;

(j) integrating Clow' and Chigh to obtain a final binary image P$_1$=[Clow';Chigh], and then restoring the pixel value of each pixel point to obtain the final encrypted grayscale image E;

wherein the two-dimensional lag complex Logistic mapping system described in step (b) specifically comprises: starting with one-dimensional Logistic map, expanding its variables from real number domain to complex number domain, and adding an unknown parameter for amplitude modulation, thereby constructing a two-dimensional lag complex chaotic system with two unknown parameters, and its expression is as follows:

$$\begin{cases} w_{n+1} = bw_n(1-z_n) \\ z_{n+1} = ax_n^2 + y_n^2 \end{cases}$$

Where w$_n$=x$_n$+jy$_n$ is a complex variable, z$_n$ represents a constant sequence, and a and b are both system parameters in which a is a real number and b is a positive real number.

Preferably, the parameter of the two-dimensional lag complex Logistic mapping system is a=2, b=1.94.

Preferably, the initial system value in step (b) is (0.2,0.4,0.1), and the initial system value in step (f) is (0.3,0.5,0.2).

Preferably, N$_0$=250.

Preferably, the parameter a of the two-dimensional lag complex Logistic mapping system is in the range of (−4,7].

Corresponding to the above encryption method, an image decryption communication algorithm based on two-dimensional lag complex Logistic map comprises the steps of:

(a1) dividing a grayscale image E into eight bit planes, wherein the lower four-bit plane and the upper four-bit plane are Clow' and Chigh, respectively;

(b1) selecting the same initial parameters and initial values as those in the image encryption communication algorithm based on the two-dimensional lag complex Logistic map, as described above, to iterate the system to obtain chaotic sequences: x, x$_1$, x$_2$, x$_3$ and x', x'$_1$, x'$_2$, x'$_3$, position sequences: T$_1$, T$_2$, T$_3$, T$_4$, T$_{-1}$, T$_{-2}$, T$_{-3}$, T$_{-4}$, T'$_1$, T'$_2$, T'$_3$, T'$_4$, T'$_{-1}$, T'$_{-2}$, T'$_{-3}$, T'$_{-4}$, and f$_{-1}$, f$_{-2}$, T$_{f1}$, T$_{f2}$;

(c1) inversely scrambling Clow' by using T'$_{-1}$, T'$_{-2}$, T'$_{-3}$, T'$_{-4}$ to obtain Clow; inversely scrambling Clow and Chigh by using T$_{f1}$ and T$_{f2}$ to obtain clow and chigh;

(d1) inversely diffusing the bit planes by the formula Hp=(chigh−f$_{-2}$−Clow')mod2 to obtain the bit plane Hp, and then inversely scrambling Hp using T'$_1$, T'$_2$, T'$_3$, T'$_4$ to obtain the upper four-bit plane H of a plaintext image;

(e1) scrambling H using the position sequence T$_{-1}$, T$_{-2}$, T$_{-3}$, T$_{-4}$ to obtain the bit plane HH;

(f1) implementing inverse diffusion operation by the formula Lp=(clow−f$_{-1}$−HH) mod 2 to obtain the bit plane Lp, and then inversely scrambling Lp using T$_1$, T$_2$, T$_3$, T$_4$ to obtain the lower four-bit plane L of a plaintext image;

(g1) integrating L and H to obtain a binary image P=[L; H] of a plaintext image;

(h1) finally, restoring the pixel value of each pixel point to obtain the final grayscale image X.

Preferably, the initial parameter is a=2, b=1.94.

Preferably, the initial values are (0.2,0.4,0.1) and (0.3,0.5, 0.2), respectively.

An image encryption and decryption communication algorithm based on two-dimensional lag complex Logistic map comprises the steps of:

encrypting the grayscale image X to be encrypted by using the encryption communication algorithm to obtain the final encrypted grayscale image E;

decrypting the finally encrypted grayscale image E by using the decryption communication algorithm to obtain the grayscale image X to be encrypted.

According to the specific embodiment provided by the present disclosure, the present disclosure discloses the following technical effects.

The present disclosure expands the variables of one-dimensional Logistic map from the real number domain to the complex number domain, improves the dimension of the mapping system, increases the number of keys, and expands the mapping range, wherein the new mapping system is more sensitive to small disturbances of initial values and parameters. The parameters a and b can control the chaotic characteristics and amplitudes of the system, respectively.

According to the present disclosure, the image encryption algorithm based on two-dimensional lag complex Logistic map can break the strong correlation between pixels in the original image, so that the pixels of the encrypted image are uniformly distributed in the whole plane, and the features of the original image are hidden. The receiving terminal can recover the original image and decrypt the image only when the receiving terminal and the sending terminal contain the same key.

DETAILED DESCRIPTION

The technical scheme in the embodiments of the present disclosure will be described clearly and completely hereinafter. Obviously, the described embodiments are only some embodiments of the present disclosure, rather than all of the embodiments. Based on the embodiments of the present disclosure, all other embodiments obtained by those skilled in the art without paying creative labor belong to the scope of protection of the present disclosure.

The present disclosure starts with one-dimensional Logistic map, expands its variables from real number domain to complex number domain, and adds an unknown parameter for amplitude modulation, thereby constructing a two-dimensional lag complex chaotic system with two unknown parameters, which is referred to as 2D-LCLM (two-dimensional lag-complex logistic map) for short, and is applied to digital image encryption communication.

The expression of 2D-LCLM is shown in (1), which is evolved from the most basic Logistic map $x_{n+1}=bx_n(1-x_n)$:

$$\begin{cases} w_{n+1} = bw_n(1-z_n) \\ z_{n+1} = ax_n^2 + y_n^2 \end{cases} \quad (1)$$

where w$_n$=x$_n$+jy$_n$ is a complex variable, z$_n$ represents a constant sequence, and a and b are both system parameters in which a is a real number and b is a positive real number. The real part and the imaginary part of $w_n$ are expanded to obtain:

$$\begin{cases} x_{n+1} = bx_n(1 - z_n) \\ y_{n+1} = by_n(1 - z_n) \\ z_{n+1} = ax_n^2 + y_n^2 \end{cases} \quad (2)$$

When 1.69≤b<2, the system is in a chaotic state, and when b≥2, the chaotic boundary crisis occurs in the system. The parameter has nothing to do with whether the system is chaotic or not, and is only used to adjust the amplitude of the mapping system.

2D-LCLM expands the variables of one-dimensional Logistic map from the real number domain to the complex number domain, improves the dimension of the mapping system, increases the number of keys and expands the mapping range, wherein the new mapping system is more sensitive to small disturbances of initial values and parameters. The parameters a and b can control the chaotic characteristics and amplitudes of the system, respectively.

When applying 2D-LCLM to digital image encryption communication, the initial values and parameters of 2D-LCLM at the sending terminal are first set, the chaotic map is iterated, and the pseudo-random sequences generated by iteration are used to replace and scramble the pixels in the image, so as to break the strong correlation between adjacent pixels in the original image and realize image encryption. The encrypted image is transmitted to the receiving terminal through wireless network, and the receiving terminal sets the same chaotic initial values and parameters as the sending terminal, that is, the keys of the sending terminal and the receiving terminal are synchronized, so as to decrypt the image.

Embodiment 1

An image encryption communication algorithm based on two-dimensional lag complex Logistic map comprises the steps of:

S1, reading a M×N dimensional grayscale image X to be encrypted, expressing the value of each pixel point in X by eight binary numbers, that is, dividing the value into eight bit planes; and taking the upper four-bit plane as H, and the lower four-bit plane as L, wherein each bit plane is a binary matrix of M×N;

S2, when b=1.94, the chaotic system has the best performance for image encryption, and the range of parameter a will decrease with the increase of b, but the range always includes intervals (−4,7], so that the parameter of the two-dimensional lag complex Logistic mapping system is a=2, b=1.94, and the initial system value is (0.2,0.4,0.1), iterating the system N=250+2×M×N times, abandoning the previous 250 iteration tracks to avoid instantaneous effect, so as to obtain four chaotic sequences x, $x_1$, $x_2$, $x_3$ with length 2×M×N, where $$x = \frac{x_1 + x_2 + x_3}{3};$$

sorting the previous M×N numbers of the four chaotic sequences in an ascending order to obtain the position sequences $T_1$, $T_2$, $T_3$, $T_4$; then sorting the later M×N numbers of the four chaotic sequences in an ascending order to obtain the position sequences $T_{-1}$, $T_{-2}$, $T_{-3}$, $T_{-4}$;

S3, scrambling the lower four-bit plane L by using the position sequences $T_1$, $T_2$, $T_3$, $T_4$ to obtain a new lower four-bit plane Lp; scrambling the upper four-bit plane H by using the position sequences $T_{-1}$, $T_{-2}$, $T_{-3}$, $T_{-4}$ to obtain a new upper four-bit plane HH;

S4, performing modulo operation on the chaotic sequence $x_1$ according to the formula $f_1=\lfloor |x_1|*10^{15} \bmod 256 \rfloor$ to obtain a matrix $f_1$ containing M×N decimal numbers; dividing $f_1$ into eight bit planes by converting decimal numbers to binary numbers; taking the lower four-bit plane as $f_{-1}$, and then sorting the sequence in $f_{-1}$ in an ascending order to obtain the position sequence $T_{f1}$;

S5, superposing and performing modulo operation on a plurality of bit planes according to the formula clow=($f_{-1}$+Lp+HH)mod2 to obtain a new binary matrix clow, wherein mod is a complementary function; scrambling clow using $T_{f1}$ to obtain Clow;

S6, keeping the parameters of the system unchanged, re-taking the initial value (0.3,0.5,0.2), iterating the system N=250+2×M×N times, and abandoning the previous 250 iteration tracks to avoid instantaneous effect, so as to obtain four chaotic sequences which is denoted as x', $x'_1$, $x'_2$, $x'_3$ with length 2×M×N, where $$x' = \frac{x'_1 + x'_2 + x'_3}{3};$$

sorting the previous M×N numbers of the chaotic sequences in an ascending order to obtain the position sequences $T'_1$, $T'_2$, $T'_3$, $T'_4$; then sorting the later M×N numbers of the chaotic sequences in an ascending order to obtain the position sequences $T_1$, $T_2$, $T_3$, $T_4$;

S7, scrambling the upper four-bit plane H by using the position sequences $T'_1$, $T'_2$, $T'_3$, $T'_4$ to obtain a new upper four-bit plane Hp; scrambling Clow by using the position sequences $T'_{-1}$, $T'_{-2}$, $T'_{-3}$, $T'_{-4}$ to obtain the final encrypted lower four-bit plane Clow';

S8, performing modulo operation on the chaotic sequence $x_2$ according to the formula $f_2=\lfloor |x_2|*10^{15} \bmod 256 \rfloor$ to obtain a matrix $f_2$ containing M×N decimal numbers; dividing $f_2$ into eight bit planes by converting decimal numbers to binary numbers; taking the lower four-bit plane as $f_{-2}$, and then sorting the sequence in $f_{-2}$ in an ascending order to obtain the position sequence $T_{f2}$;

S9, superposing and performing modulo operation on a plurality of bit planes according to the formula chigh=($f_{-2}$+Hp+Clow')mod2 to obtain a new binary matrix chigh; scrambling chigh using $T_{f2}$ to obtain the final encrypted upper four-bit plane Chigh;

S10, integrating Clow' and Chigh to obtain a final binary image $P_1$=[Clow';Chigh], and then restoring the pixel value of each pixel point in $P_1$ to obtain the finally encrypted grayscale image E.

Embodiment 2

An image decryption communication algorithm based on two-dimensional lag complex Logistic map comprises the steps of:

S1, dividing a grayscale image E into eight bit planes, wherein the lower four-bit plane and the upper four-bit plane are Clow' and Chigh, respectively; that is to say, the final encrypted grayscale image E is divided into eight bit planes, the lower four-bit plane is Clow', and the upper four-bit plane is Chigh; the upper four-bit plane is also referred to as the finally encrypted upper four-bit binary image, and the lower four-bit plane is also referred to as the scrambled lower four-bit binary image;

S2, selecting the same initial parameters and initial values as those in the image encryption communication algorithm based on the two-dimensional lag complex Logistic map according to claim 1 to iterate the 2D-LCLM to obtain chaotic sequences: x, $x_1$, $x_2$, $x_3$ and x', $x'_1$, $x'_2$, $x'_3$, position sequences: $T_1$, $T_2$, $T_3$, $T_4$, $T_{-1}$, $T_{-2}$, $T_{-3}$, $T_{-4}$, $T'_{-1}$, $T'_{-2}$, $T'_{-3}$, $T'_{-4}$, $T_{f1}$ and $T_{f2}$ and four-bit planes $f_{-1}$, $f_{-2}$; the same initial parameters are a=2, b=1.94, and the initial values are (0.2, 0.4,0.1) and (0.3,0.5,0.2), respectively.

S3, inversely scrambling Clow' by using $T'_{-1}$, $T'_{-2}$, $T'_{-3}$, $T'_{-4}$ to obtain Clow; inversely scrambling Clow and Chigh by using $T_{f1}$ and $T_{f2}$ to obtain clow and chigh; that is to say, inversely scrambling Clow by using $T_{f1}$ to obtain a new binary matrix clow, and inversely scrambling Chigh by using $T_{f2}$ to obtain a new binary matrix chigh;

S4, inversely diffusing the bit planes by the formula Hp=(chigh−$f_{-2}$−Clow')mod2 to obtain the upper four-bit plane Hp, and then inversely scrambling Hp using $T'_1$, $T'_2$, $T'_3$, $T'_4$ to obtain the upper four-bit binary value H of a plaintext image; wherein the upper four-bit binary image H is the upper four-bit plane H in Embodiment 1;

S5, scrambling H using the position sequences $T_{-1}$, $T_{-2}$, $T_{-3}$, $T_{-4}$ to obtain the upper four-bit plane HH;

S6, implementing inverse diffusion operation by the formula Lp=(clow−$f_{-1}$−HH)mod2 to obtain the lower four-bit plane Lp, and then inversely scrambling Lp using $T_1$, $T_2$, $T_3$, $T_4$ to obtain the lower four-bit binary image L of a plaintext image; wherein the lower four-bit binary image L is the lower four-bit plane L in Embodiment 1;

S7, integrating L and H to obtain a binary image P=[L; H] of a plaintext image;

S8, finally, restoring the pixel value of each pixel point in P to obtain the final grayscale image X.

Embodiment 3

An image encryption and decryption communication algorithm based on two-dimensional lag complex Logistic map comprises the steps of:

encrypting the grayscale image X to be encrypted by using the encryption communication algorithm of embodiment 1 to obtain the finally encrypted grayscale image E;

decrypting the finally encrypted grayscale image E by using the decryption communication algorithm of embodiment 2 to obtain the grayscale image X to be encrypted.

The same parts in Embodiment 3 as those in Embodiments 1 and 2 will not be discussed in detail.

In this paper, a specific example is applied to illustrate the principle and implementation of the present disclosure, and the explanation of the above embodiments is only used to help understand the method and its core idea of the present disclosure. At the same time, according to the idea of the present disclosure, there will be some changes in the specific implementation and application scope for those skilled in the art. To sum up, the contents of this specification should not be construed as limiting the present disclosure.

What is claimed is:
1. A method for image encryption based on two-dimensional lag complex Logistic map, the method being performed at a sending terminal, the method comprising the steps of:

(a) reading a M×N dimensional grayscale image X to be encrypted, expressing the value of each pixel point in X by eight binary numbers, that is, dividing the value into eight bit planes; and taking the upper four-bit plane as H, and the lower four-bit plane as L, wherein each bit plane is a binary matrix of M×N;

(b) taking the value range of parameter b of the two-dimensional lag complex Logistic mapping system as [1.69,2), taking parameter a as a real number that can be positive or negative, taking the values of a and b in the range, giving any initial value to the system, and iterating the system N=$N_0$+2×M×N times, where $N_0 \in N^*$, and abandoning the previous $N_0$ iteration tracks to avoid instantaneous effect, so as to obtain four chaotic sequences x, $x_1$, $x_2$, $x_3$ with length 2×M×N, where $$x = \frac{x_1 + x_2 + x_3}{3};$$

sorting the previous M×N numbers of the four chaotic sequences in an ascending order to obtain the position sequences $T_1$, $T_2$, $T_3$, $T_4$; then sorting the later M×N numbers of the four chaotic sequences in an ascending order to obtain the position sequences $T_{-1}$, $T_{-2}$, $T_{-3}$, $T_{-4}$;

(c) scrambling the lower four-bit plane L by using the position sequences $T_1$, $T_2$, $T_3$, $T_4$ to obtain a new lower four-bit plane Lp; scrambling the upper four-bit plane H by using the position sequences $T_{-1}$, $T_{-2}$, $T_{-3}$, $T_{-4}$ to obtain a new upper four-bit plane HH;

(d) performing modulo operation on the chaotic sequence $x_1$ according to the formula $f_1 = \lfloor |x_1|*10^{15} \mod 256 \rfloor$ to obtain a matrix $f_1$ containing M×N decimal numbers; dividing $f_1$ into eight bit planes by converting decimal numbers to binary numbers, taking the lower four-bit plane as $f_{-1}$, and then sorting the sequence in $f_{-1}$ in an ascending order to obtain the position sequence $T_{f1}$;

(e) superposing and performing modulo operation on a plurality of bit planes according to the formula clow= ($f_{-1}$+Lp+HH) mod 2 to obtain a new binary matrix clow; scrambling clow using $T_{f1}$ to obtain the final encrypted lower four-bit binary image Clow;

(f) keeping the parameters of the system unchanged, re-taking the initial value, iterating the system N=$N_0$+ 2×M×N times, and abandoning the previous $N_0$ iteration tracks to avoid instantaneous effect, so as to obtain four chaotic sequences which is denoted as x', $x'_1$, $x'_2$, $x'_3$ with length 2×M×N, where $$x' = \frac{x'_1 + x'_2 + x'_3}{3};$$

sorting the previous M×N numbers of the chaotic sequences in an ascending order to obtain the position sequences $T'_1$, $T'_2$, $T'_3$, $T'_4$; then sorting the later M×N numbers of the chaotic sequences in an ascending order to obtain the position sequences $T'_{-1}$, $T'_{-2}$, $T'_{-3}$, $T'_{-4}$;

(g) scrambling the upper four-bit plane H by using the position sequence $T'_1$, $T'_2$, $T'_3$, $T'_4$ to obtain a new upper four-bit plane Hp; scrambling Clow by using the position sequence $T'_{-1}$, $T'_{-2}$, $T'_{-3}$, $T'_{-4}$ to obtain Clow';

(h) performing modulo operation on the chaotic sequence $x_2$ according to the formula $f_2 = \lfloor |x_2|*10^{15} \mod 256 \rfloor$ to obtain a matrix $f_2$ containing M×N decimal numbers;

dividing $f_2$ into eight bit planes by converting decimal numbers to binary numbers, taking the lower four-bit plane as $f_{-2}$, and then sorting the sequence in $f_{-2}$ in an ascending order to obtain the position sequence $T_{f2}$;

(i) superposing and performing modulo operation on a plurality of bit planes according to the formula chigh=$(f_{-2}+Hp+Clow)$ mod 2 to obtain a new binary matrix chigh; scrambling chigh using $T_{f2}$ to obtain the final encrypted upper four-bit binary image Chigh;

(j) integrating Clow and Chigh to obtain a final binary image $P_1$=[Clow; Chigh], and then restoring the pixel value of each pixel point to obtain the finally encrypted grayscale image E;

wherein the two-dimensional lag complex Logistic mapping system described in step (b) specifically comprises: starting with one-dimensional Logistic map, expanding its variables from real number domain to complex number domain, and adding an unknown parameter for amplitude modulation, thereby constructing a two-dimensional lag complex chaotic system with two unknown parameters, and its expression is as follows:

$$\begin{cases} w_{n+1} = bw_n(1-z_n) \\ z_{n+1} = ax_n^2 + y_n^2 \end{cases}$$

where $w_n = x_n + jy_n$ is a complex variable, $z_n$ represents a constant sequence, and a and b are both system parameters in which a is a real number and b is a positive real number; and (k) transmitting the finally encrypted grayscale image E to a receiving terminal through a wireless network.

2. The method according to claim 1, wherein the parameter of the two-dimensional lag complex Logistic mapping system is a=2, b=1.94.

3. The method according to claim 1, wherein the initial system value in step (b) is (0.2,0.4,0.1), and the initial system value in step (f) is (0.3,0.5,0.2).

4. The method according to claim 1, wherein the parameters in step (b) and step (f) are $N_0$=250.

5. The method according to claim 1, wherein the parameter a of the two-dimensional lag complex Logistic mapping system is in the range of (−4,7].

6. A method for image decryption based on two-dimensional lag complex Logistic map corresponding to the encryption method according to claim 1, the method being performed at the receiving terminal, the method comprising the steps of:

(a1) dividing the grayscale image E received from the sending terminal into eight bit planes, wherein the lower four-bit plane and the upper four-bit plane are Clow and Chigh respectively;

(b1) selecting the same initial parameters and initial values as those in the image encryption communication algorithm based on the two-dimensional lag complex Logistic map according to claim 1 to iterate the system to obtain chaotic sequences: x, $x_1$, $x_2$, $x_3$ and x', $x'_1$, $x'_2$, $x'_3$, position sequences: $T_1$, $T_2$, $T_3$, $T_4$, $T_{-1}$, $T_{-2}$, $T_{-3}$, $T_{-4}$, $T'_1$, $T'_2$, $T'_3$, $T'_4$, $T'_{-1}$, $T'_{-2}$, $T'_{-3}$, $T'_{-4}$, and $f_{-1}$, $f_{-2}$, $T_{f1}$, $T_{f2}$;

(c1) inversely scrambling Clow by using $T'_{-1}$, $T'_{-2}$, $T'_{-3}$, $T'_{-4}$ to obtain Chow; inversely scrambling Clow and Chigh by using $T_{f1}$ and $T_{f2}$ to obtain clow and chigh;

(d1) inversely diffusing the bit planes by the formula Hp=(chigh−$f_{-2}$−Clow) mod 2 to obtain the bit plane Hp, and then inversely scrambling Hp using $T'_1$, $T'_2$, $T'_3$, $T'_4$ to obtain the upper four-bit binary value H of a plaintext image;

(e1) scrambling H using the position sequence $T''_{-1}$, $T''_{-2}$, $T''_{-3}$, $T''_{-4}$ to obtain the bit plane HH;

(f1) implementing inverse diffusion operation by the formula Lp=(clow−$f_{-1}$−HH) mod 2 to obtain the bit plane Lp, and then inversely scrambling Lp using $T_1$, $T_2$, $T_3$, $T_4$ to obtain the lower four-bit binary image L of a plaintext image;

(g1) integrating L and H to obtain a binary image P=[L;H] of a plaintext (h1) finally, restoring the pixel value of each pixel point to obtain the final grayscale image X.

7. The method according to claim 6, wherein the parameter of the two-dimensional lag complex Logistic mapping system is a=2, b=1.94.

8. The method according to claim 6, wherein the initial system value in step (b1) is (0.2,0.4,0.1), and the initial system value-in step (f1) is (0.3,0.5,0.2).

9. The method according to claim 6, wherein the parameters in step (b1) and step (f1) are $N_0$=250.

10. The method according to claim 6, wherein the parameter a of the two-dimensional lag complex Logistic mapping system is in the range of (−4,7].

11. The method according to claim 6, wherein the initial parameter is a=2, b=1.94.

12. The method according to claim 7, wherein the initial parameter is a=2, b=1.94.

13. The method two dimensional lag complex Logistic map according to claim 8, wherein the initial parameter is a=2, b=1.94.

14. The method according to claim 9, wherein the initial parameter is a=2, b=1.94.

15. The method according to claim 10, wherein the initial parameter is a=2, b=1.94.

16. The method according to claim 6, wherein the initial values are (0.2,0.4,0.1) and (0.3,0.5,0.2), respectively.

17. The method according to claim 7, wherein the initial values are (0.2,0.4,0.1) and (0.3,0.5,0.2), respectively.

18. The method according to claim 8, wherein the initial values are (0.2,0.4,0.1) and (0.3,0.5,0.2), respectively.

19. The method according to claim 9, wherein the initial values are (0.2,0.4,0.1) and (0.3,0.5,0.2), respectively.

20. A method for image encryption and decryption based on two-dimensional lag complex Logistic map, comprising the steps of:

encrypting, at the sending terminal, the grayscale image X to be encrypted by using the encryption method according to claim 1 to obtain the finally encrypted grayscale image E;

transmitting, at the sending terminal, the finally encrypted grayscale image E to the receiving terminal through the wireless network; and at the receiving terminal, receiving the finally encrypted grayscale image E, and decrypting the finally encrypted grayscale image E by using the decryption method according to claim 6 to obtain the grayscale image X to be encrypted.

* * * * *